United States Patent
Doerr

(10) Patent No.: US 7,403,682 B1
(45) Date of Patent: Jul. 22, 2008

(54) DISPERSION COMPENSATION APPARATUS

(75) Inventor: Christopher Doerr, Middletown, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 11/943,949

(22) Filed: Nov. 21, 2007

(51) Int. Cl.
*G02B 6/26* (2006.01)
*G02B 6/28* (2006.01)
*G02B 6/34* (2006.01)

(52) U.S. Cl. .............................. 385/37; 385/14; 385/24; 385/46

(58) Field of Classification Search .................. 385/14, 385/24, 37, 39, 46
See application file for complete search history.

(56) References Cited

U.S. PATENT DOCUMENTS 5,909,522 A * 6/1999 Shirasaki et al. ............. 385/24

* cited by examiner

*Primary Examiner*—Frank G Font
*Assistant Examiner*—Michael P Mooney

(57) ABSTRACT

A dispersion compensation apparatus employing an arrayed-waveguide-grating (AWG) which exhibits a dispersion slope.

11 Claims, 4 Drawing Sheets

DISPERSION COMPENSATION APPARATUS

FIELD OF THE INVENTION

This invention relates generally to the field of optical communications and in particular to an arrayed-waveguide-grating (AWG) based tunable optical dispersion compensator (TODC) which exhibits dispersion slope.

BACKGROUND OF THE INVENTION

In long-distance transmission of optical signals, the accumulation of signal dispersion presents serious problems. These problems intensify with an increase in bit rate and the distance traveled by the optical signals. To date, efforts that compensate for dispersion have mainly involved the use of dispersion compensating fibers, filter-type dispersion compensating devices or a combination of both.

Colorless TODCs have proven quite useful for compensating optical fiber chromatic dispersion. Optical fiber however, imparts not only chromatic dispersion but slope dispersion (change of dispersion from channel to channel of a wavelength-division multiplexed (WDM) optical signal) to optical signals as well. Conventional TODCs exhibit nearly zero dispersion slope, hence they do not provide any significant dispersion slope compensation.

SUMMARY OF THE INVENTION

An advance is made in the art according to the principles of the present invention directed to an arrayed-waveguide-grating based tunable optical dispersion compensator. In sharp contrast to the prior art, an AWG-TODC constructed according to the present invention advantageously exhibits both dispersion compensation and dispersion slope compensation.

This advance is made, in accordance with the principles of the invention, by employing an AWG having a quantized parabolic component. More specifically, in a prior art AWG, the grating arms have a length L(m), where m is the mth arm of the grating which may be represented by $L(m)=mA\lambda_0/n$.— which is a linear distribution—and A is the grating order, $\lambda_0$ is the center wavelength, and n is the refractive index.

According to the present invention, L(m) with the quantized parabolic component added may be represented by:

$$L(m) = \frac{\lambda_0}{n}\left\{Am + \text{round}\left[\gamma\left(\frac{m - \frac{M+1}{2}}{\frac{M-1}{2}}\right)^2\right]\right\},$$

where round is a function that rounds its argument to the nearest integer, $\gamma$ is a constant that determines the amount of chirp, M is the total number of grating waveguides.

BRIEF DESCRIPTION OF THE DRAWING

A more complete understanding of the present invention may be realized by reference to the accompanying drawings in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Optical switching, multiplexing, and demultiplexing have been accomplished in the past by using an interconnection apparatus having one or more input waveguides communicating with the input of a star coupler. The output of the star coupler communicates with an optical grating comprising a series of optical waveguides, each of the waveguides differing in length with respect to its nearest neighbor by a predetermined fixed amount (Arrayed Waveguide Grating—AWG). The grating is connected to the input of a second star coupler. The second star coupler has one or more output waveguides which form the outputs of the switching, multiplexing, and demultiplexing apparatus. An example of such an interconnection apparatus is disclosed in U.S. Pat. Nos. 5,002,350 and 5,136,671, the entire contents and teachings of which are incorporated herein by reference.

Figure 1:
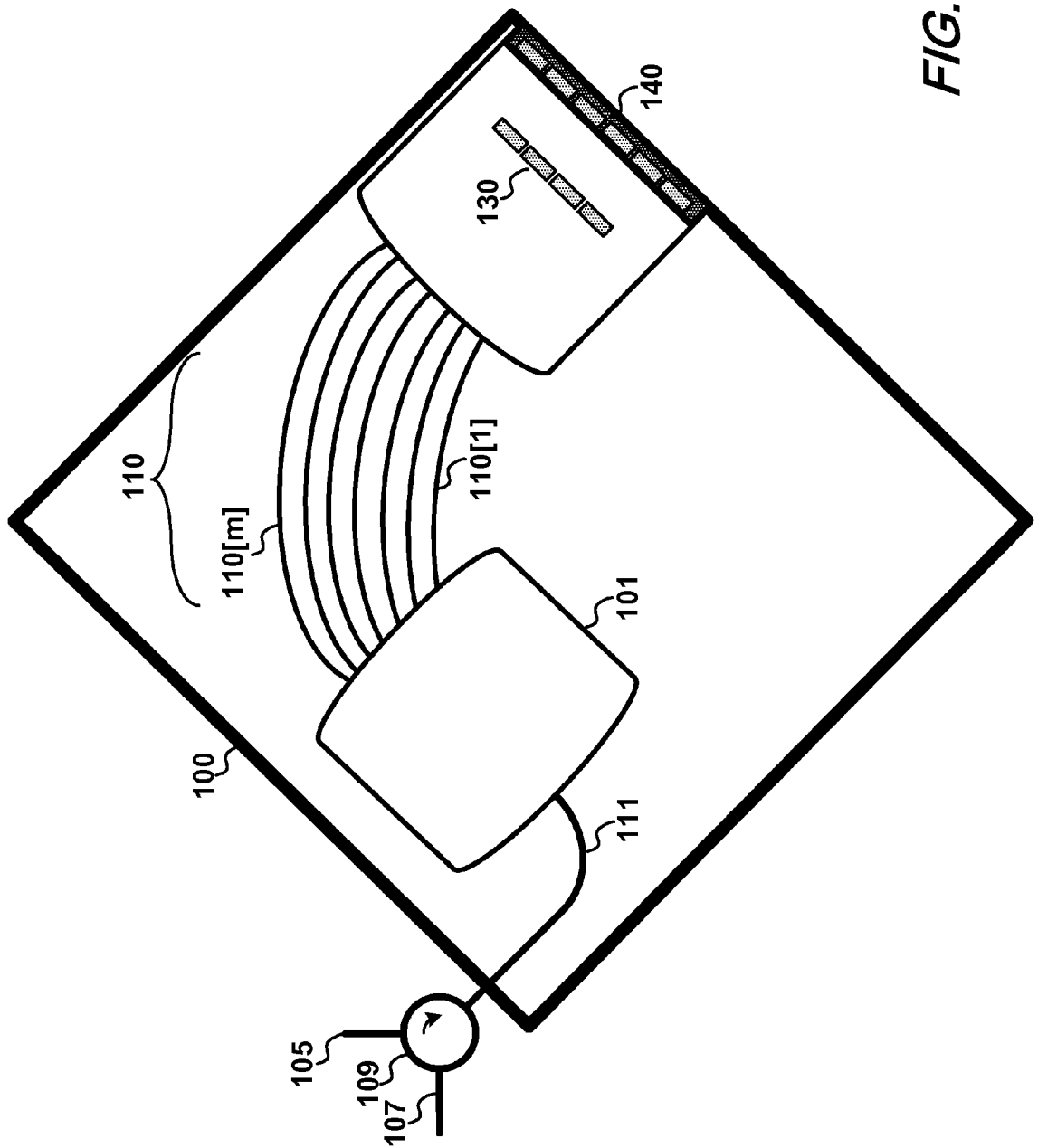
FIG. 1 is a schematic of a layout for an AWG-based TODC having a dispersion slope according to the present invention.
Figure 2:
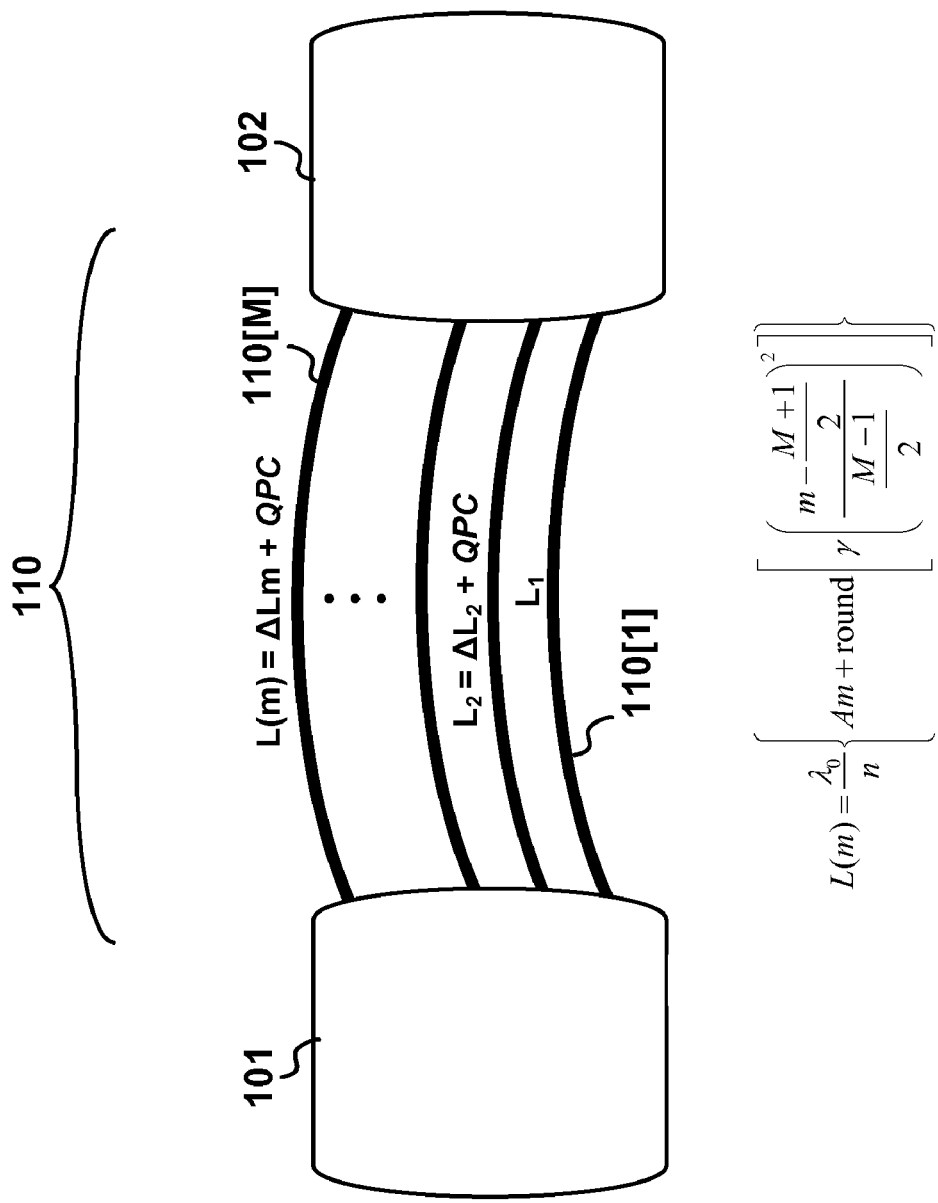
FIG. 2 is a schematic of an AWG employed in an AWG-based TODC according to the present invention including arm-length relationships.

Sharing some common elements with such devices, FIG. 1 shows details of a dispersion compensation apparatus constructed according to the teachings of the present invention. The apparatus—which may advantageously be integrated onto a common substrate 100—includes a bidirectional input/output waveguide 111 connected to an input circle of a free space region of a slab waveguide 101 (first star coupler).

A plurality of output ports extend from an output circle of the free space region of the slab waveguide 101 and are connected to an optical grating 110 known to those skilled in the art as an arrayed waveguide grating (AWG). The optical grating 110 comprises a plurality of unequal length waveguides 110[1] . . . 110[m] which provides a predetermined amount of path length difference to a corresponding plurality of input waveguides connected to an input circle of a free space region of another slab waveguide 102 (second star coupler).

At an opposite, output end of the other slab waveguide 102, one or more mirrors 140 are positioned at the focal plane (where output waveguides would be located in a frequency routing device). Additionally, one or more adjustable lenses 130, are positioned in the optical paths between the input waveguides 110[1] ... 110[m] and the mirror(s) 140 within the slab waveguide 102.

Accordingly, light arriving via waveguide (or optical fiber) 105 is directed via, for example, a circulator 109 into the input/output waveguide 111 where it traverses the first slab waveguide 101, the grating 110, the second slab waveguide 102 including the adjustable lens(es) 130 and reflected by mirror(s) 140. The reflected light is then directed back through the slab waveguide 102, the grating 110, first slab waveguide 101, input/output waveguide 111 and subsequently output via circulator 109 and waveguide (optical fiber) 107 having a majority of its accumulated dispersion desirably compensated.

In a preferred embodiment, the mirror(s) 140 are substantially flat, consequently it is relatively easy to fabricate and assemble. Additionally, the lens(es) 130 may be any of a number of ones of available to designers, i.e., thermooptic lenses.

Advantageously—and according to the present invention—a desirable amount of dispersion slope is added to the TODC by changing the length(s) of the arms comprising the AWG. More particularly, and as noted previously, in a conventional, prior art AWG the grating arm lengths exhibit a length L(m), where m is the mth arm of the grating and which may be represented by $L(m) = mA\lambda_0/n$, which those skilled in the art will readily appreciate is a linear deviation. The quantized parabolic component added—according to the present invention—may be represented by $$L(m) = \frac{\lambda_0}{n}\left\{Am + \text{round}\left[\gamma\left(\frac{m - \frac{M+1}{2}}{\frac{M-1}{2}}\right)^2\right]\right\}.$$

A typical value for $\gamma$ for compensating the dispersion slope of standard single-mode fiber is −100. Advantageously, when constructed in this manner, the resulting TODC exhibits a dispersion slope which is proportional to the amount of dispersion that the TODC is tuned to. Thus $\gamma$ is a constant for each fiber type and is independent of the fiber length.

The principle of operation is as follows: the intentional chirp that is added to the AWG in this invention causes the focal length of the AWG to change with wavelength. The quantizing of the chirp (by using the "round" function) insures that the AWG is in focus at the desired center wavelength $\lambda_0$. As the wavelength differs from 10, the AWG focal length changes. An out-of-focus AWG exhibits a small dispersion. Thus the chirping of the AWG causes a small dispersion change with wavelength that is added on top of the dispersion provided by the lens and mirror.

Figure 3A:
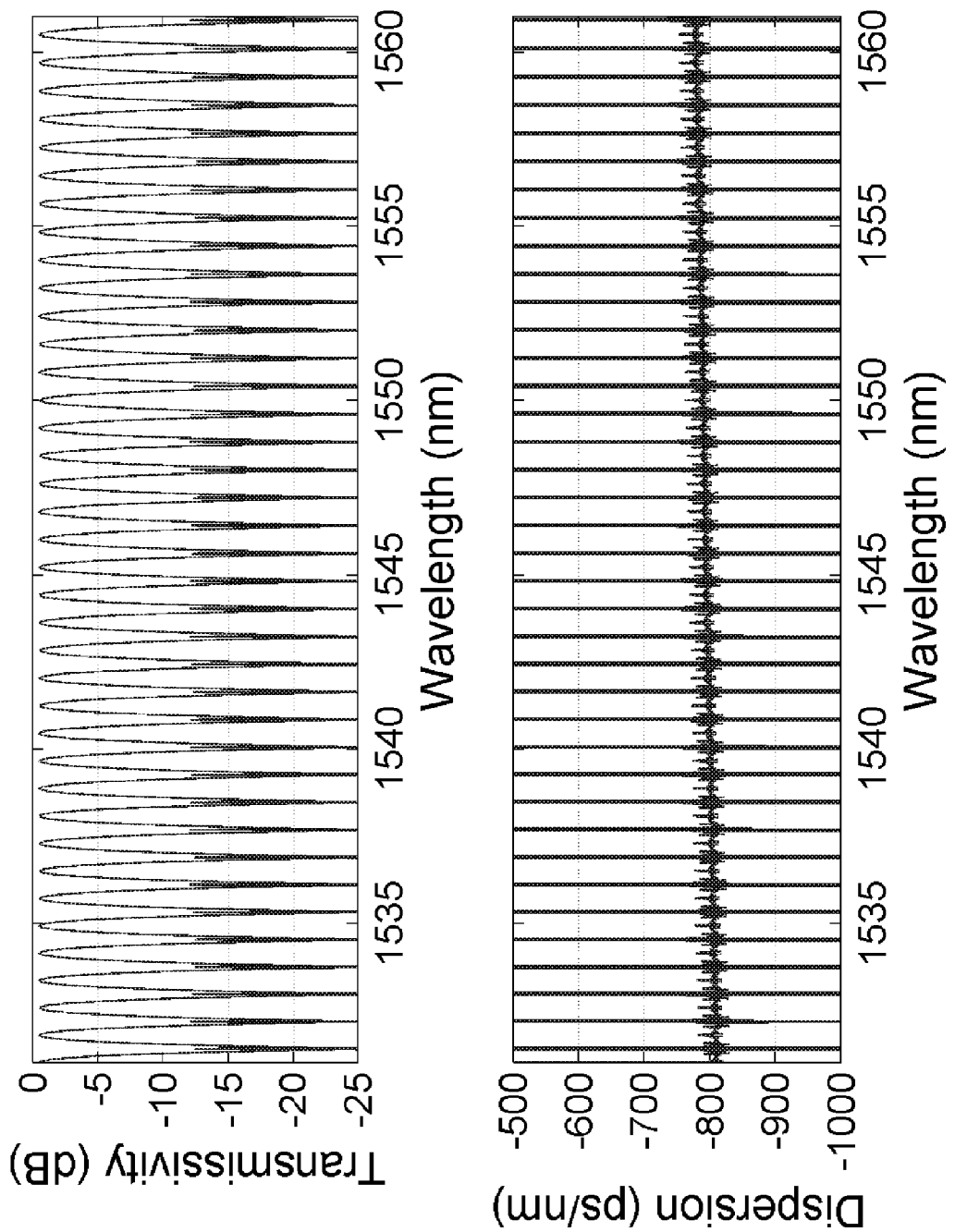
FIG. 3(A) and FIG. 3(B) are graphs of simulation results for an AWG TODC according to the present invention with gamma=0 and gamma=70 respectively.
Figure 3B:
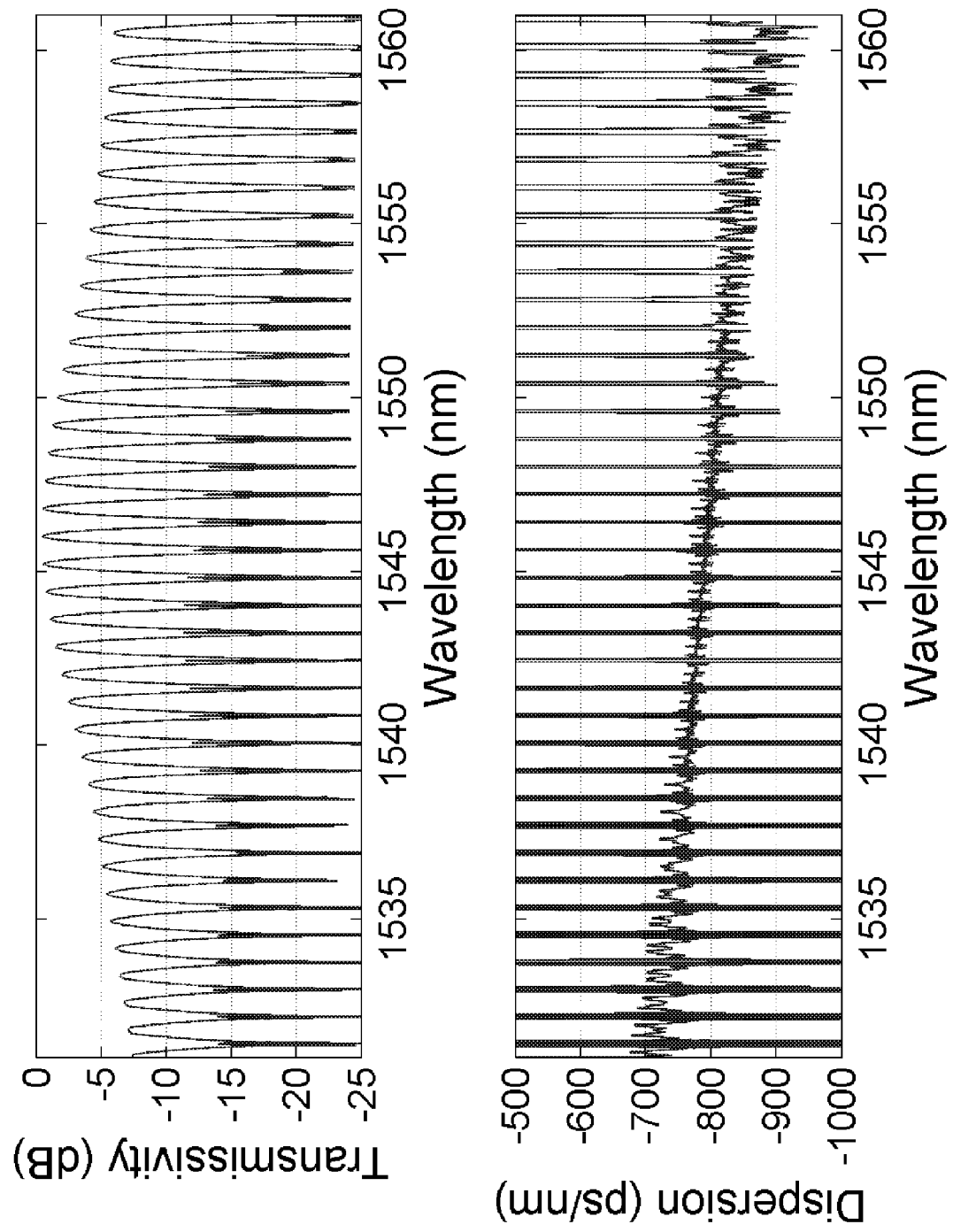

Simulation results of an AWG TODC with gamma=0 and gamma=−100 are shown in FIG. 3(A) and FIG. 3(B), respectively. In FIG. 3(B), one can see that the dispersion has a slope, with the dispersion changing from about −850 ps/nm at low-wavelength channels to −750 ps/nm at high-wavelength channels. One can also see a drawback to this design, which is that the insertion loss increases for channels far from $\lambda_0$ (1546 nm in this case).

This scheme can also be applied to modified AWG-based TODCs, such as that described in U.S. patent application Ser. No. 11/690,822 filed 24 MAR 2007 entitled TUNABLE OPTICAL DISPERSION COMPENSATING APPARATUS the entire contents of which are incorporated herein by reference. In that case, the AWG is modified with the parabolic distribution, as described above, and the other parts, such as the MZI, can advantageously remain the same.

Also, although the above discussion was on tunable optical dispersion compensators, one can use this scheme to create a fixed optical dispersion compensator, in which the lens element is not adjustable, and is, for instance, just a simple mirror.

At this point, while we have discussed and described the invention using some specific examples, those skilled in the art will recognize that our teachings are not so limited. Accordingly, the invention should be only limited by the scope of the claims attached hereto.

The invention claimed is:

1. An optical dispersion compensation apparatus comprising:
   a first slab waveguide;
   a second slab waveguide;
   an arrayed waveguide grating (AWG) having a plurality of waveguide arms optically connecting the first slab waveguide to the second slab waveguide;
   CHARACTERIZED IN THAT
   each waveguide arm of the AWG exhibits a path length L(m) which is defined by a quantized parabolic component.

2. The optical apparatus of claim 1 further CHARACTERIZED IN THAT:
   each waveguide arm of the AWG exhibits a path length L(m), which is defined by the following relationship:

$$L(m) = \frac{\lambda_0}{n}\left\{Am + \text{round}\left[\gamma\left(\frac{m - \frac{M+1}{2}}{\frac{M-1}{2}}\right)^2\right]\right\}$$

where
   round is a function that rounds its argument to the nearest integer;
   A is the grating order of the AWG;
   m is the waveguide arm;
   M is the total number of waveguide arms;
   n is the refractive index of the waveguide arms;
   $\lambda_0$ is a center vacuum wavelength; and
   $\gamma$ sets a desired dispersion slope.

3. The optical apparatus of claim 2 further comprising:
   an input/output waveguide optically connected to an input port of the first slab waveguide; and
   one or more mirrors, positioned at an output side of the second slab waveguide such that light entering the apparatus via the input/output waveguide, exits the apparatus via the input/output waveguide having a desirable amount of any accumulated dispersion compensated.

4. The optical apparatus of claim 3 further comprising:
   one or more lenses, interposed between the AWG and the mirrors.

5. The optical apparatus of claim 3 further comprising a circulator, optically connected to an input waveguide, an output waveguide and the input/output waveguide such that light traversing the input waveguide is directed into the input/output waveguide through the effect of the circulator and light exiting the input/output waveguide into the circulator is directed into the output waveguide through the effect of the circulator.

6. Dispersion compensation apparatus comprising:
   an input/output waveguide;

a first free space region connected to the input/output waveguide;

an optical grating connected to the first free space region, the grating including a plurality of unequal length waveguides;

a second free space region connected to the grating; and one or more mirrors, positioned opposite to the grating relative to the second free space region such that light entering the second free space region via the grating is reflected back into the grating through the effect of the mirrors;

said dispersion compensation apparatus

CHARACTERIZED IN THAT the length of each one of the waveguides comprising the optical grating is defined by a quantized parabolic component.

7. The dispersion compensation apparatus of claim 6 further CHARACTERIZED IN THAT:

each waveguide arm of the AWG exhibits a path length L(m), which is defined by the following relationship:

$$L(m) = \frac{\lambda_0}{n}\left\{Am + \text{round}\left[\gamma\left(\frac{m - \frac{M+1}{2}}{\frac{M-1}{2}}\right)^2\right]\right\}$$

where
round is a function that rounds its argument to the nearest integer;
A is the grating order of the AWG;
m is the waveguide arm;
M is the total number of waveguide arms;
n is the refractive index of the waveguide arms;
$\lambda_0$ is a center vacuum wavelength; and
$\gamma$ sets a desired dispersion slope.

8. The optical apparatus of claim 7 further comprising:
one or more lenses, interposed between the AWG and the mirrors.

9. A method of providing a desired amount of dispersion compensation to an optical signal traversing an optical apparatus having a first and second free space region, an optical grating coupled therebetween, the grating including a plurality of unequal length waveguides, and the optical apparatus having a bidirectional input/output waveguide coupled to the first free space region and one or more mirrors reflective to light entering the second free space region, the method comprising the steps of:

configuring the lengths of the grating waveguides such that each exhibits a length which is defined by a quantized parabolic component; and introducing light into the apparatus, said light exhibiting an amount of dispersion, such that the light enters via the bidirectional input/output waveguide, traverses the first free space region, the optical grating, and the second free space region where it is reflected back through the second free space region, the optical grating and the first free space region and exits via the input/output waveguide having a desirable amount of the dispersion compensated.

10. The method of claim 9 further comprising the step of:
configuring each waveguide arm of the AWG is to exhibits a path length L(m), which is defined by the following relationship:

$$L(m) = \frac{\lambda_0}{n}\left\{Am + \text{round}\left[\gamma\left(\frac{m - \frac{M+1}{2}}{\frac{M-1}{2}}\right)^2\right]\right\}$$

where
round is a function that rounds its argument to the nearest integer;
A is the grating order of the AWG;
m is the waveguide arm;
M is the total number of waveguide arms;
n is the refractive index of the waveguide arms;
$\lambda_0$ is a center vacuum wavelength; and
$\gamma$ sets a desired dispersion slope.

11. The method of claim 10 further comprising the step of:
refracting, light traversing the second free space region through the effect of one or more lenses positioned in the free space region between the grating and the mirrors.

* * * * *